July 8, 1958        S. KRILANOVICH        2,842,376
WHEEL STEERING MECHANISM FOR CAMERA DOLLIES AND THE LIKE Filed Aug. 13, 1954        3 Sheets-Sheet 1

INVENTOR,
STEVE KRILANOVICH
BY
ATTORNEYS

July 8, 1958 S. KRILANOVICH 2,842,376
WHEEL STEERING MECHANISM FOR CAMERA DOLLIES AND THE LIKE
Filed Aug. 13, 1954 3 Sheets-Sheet 2
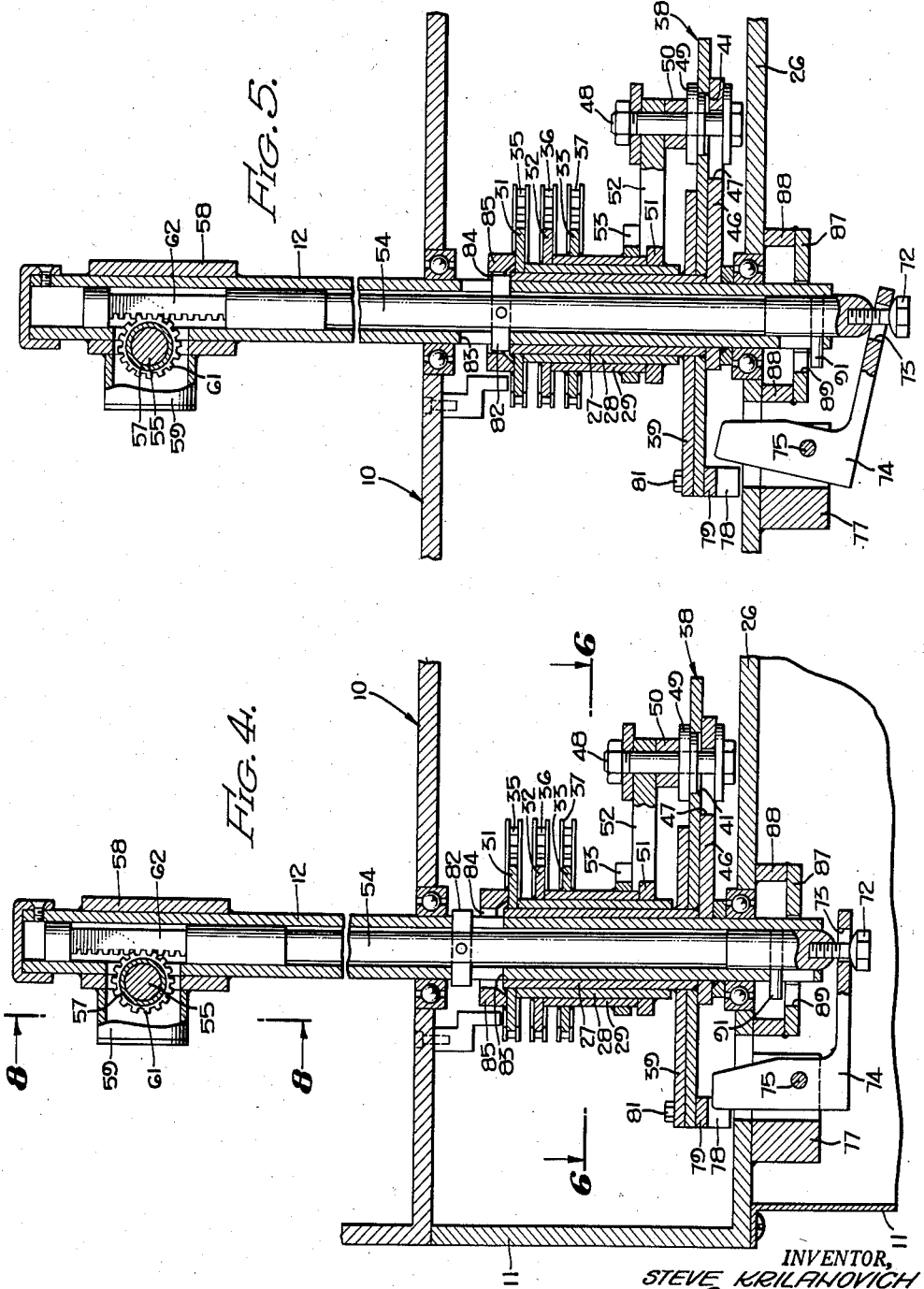
INVENTOR,
STEVE KRILANOVICH
BY
ATTORNEYS July 8, 1958 S. KRILANOVICH 2,842,376
WHEEL STEERING MECHANISM FOR CAMERA DOLLIES AND THE LIKE
Filed Aug. 13, 1954 3 Sheets-Sheet 3
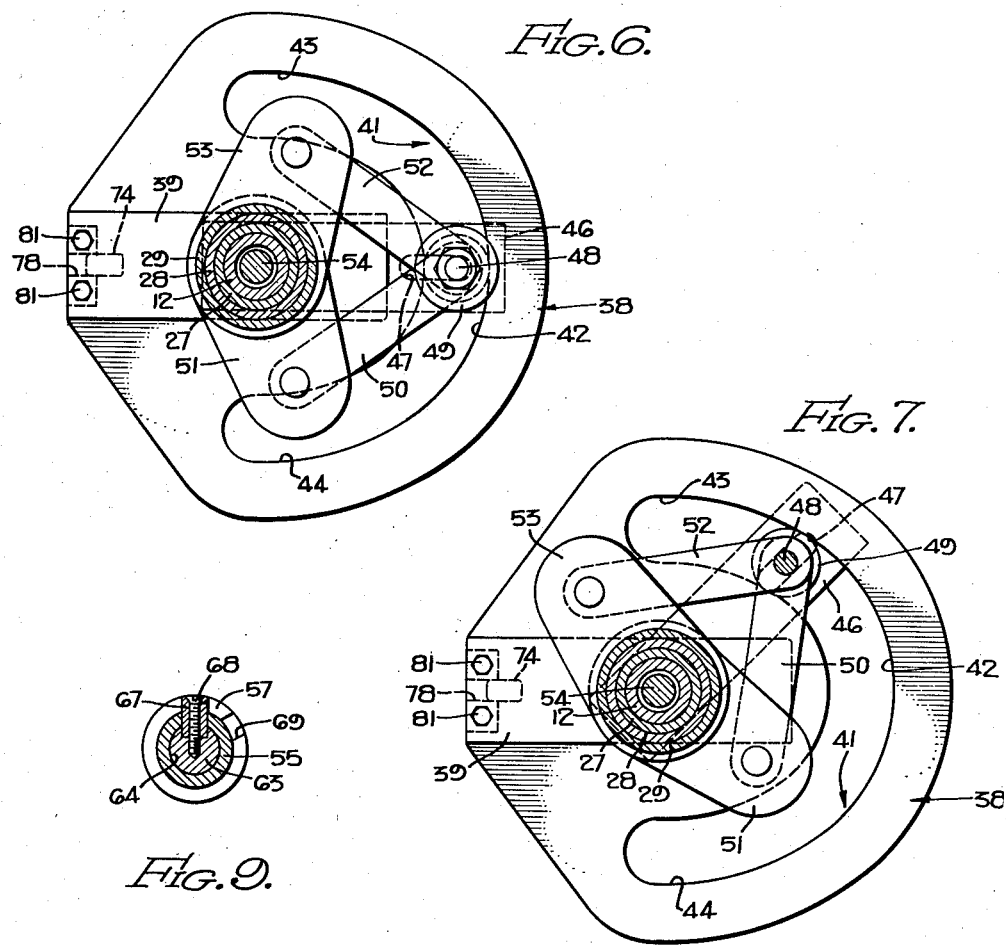
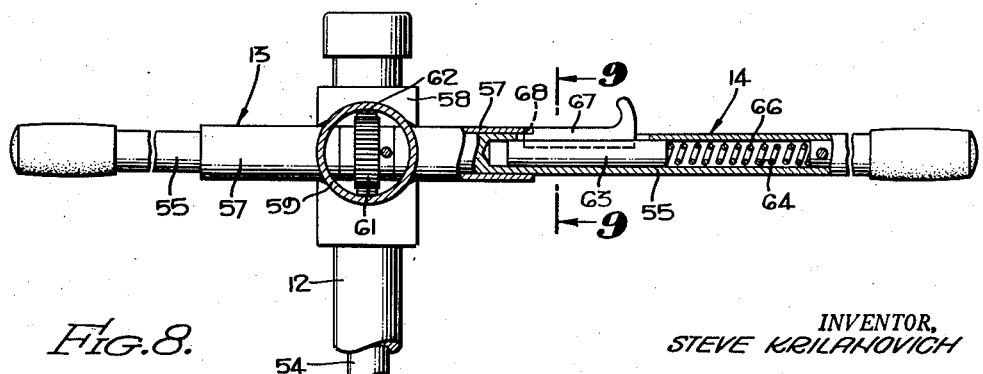
INVENTOR,
STEVE KRILANOVICH United States Patent Office 2,842,376
Patented July 8, 1958

2,842,376

WHEEL STEERING MECHANISM FOR CAMERA DOLLIES AND THE LIKE

Steve Krilanovich, North Hollywood, Calif.

Application August 13, 1954, Serial No. 449,747

16 Claims. (Cl. 280—91)

This invention relates to a wheel steering mechanism, and particularly to a steering transmission and clutch means by which the operator of a camera dolly may shift from one mode of steering to another mode of steering without taking either hand from the handle bars by which the dolly is maneuvered.

In my previous Patent No. 2,470,496, issued May 17, 1949, for a Wheel Steering Mechanism, there is shown and described a dolly, for motion picture cameras and the like, incorporating steering transmission and clutch means by which the dolly can be directed in a straight line in any forward, rearward, transverse or oblique direction, or else caused to move along a curve having a predetermined center. When the dolly is being moved in a straight line the axes of all four wheels are parallel regardless of the direction to which they may be turned, and this is commonly referred to as "square" steering. When the dolly illustrated in my previous patent is being moved in a curved line the axes of all four wheels intersect at a common center, and this is commonly referred to as "full O" steering. The "full O" steering is to be contrasted with the "half O" steering to be described in detail subsequently, and in which the axes of only two wheels intersect at a common center and the remaining two wheels are parallel to each other and directed forwardly.

Since the camera dolly is employed to move a motion picture camera while a scene from the picture is actually being shot, it will be understood that it is of extreme importance that the movement of the camera be completely free of jars or interruptions. No problem arises in this connection when the steering mechanism is set for "square" steering, for example when the dolly is being moved toward a subject for a close-up shot. Furthermore, no problem arises when the steering mechanism is set for "O" steering, such as when the camera is being moved around a subject located at the axis of rotation of the dolly. By contrast, however, a very distinct problem arises when it is desired to shift from "square" steering to "O" steering, or vise versa, while the camera continues in operation. In such situations it has been found that when the operator of the dolly removes at least one hand from the handle bars in order to operate a clutch lever or the like, a distinct jar or interruption in movement occurs, and this disturbs the continuity of the picture.

In view of the above factors characteristic of the steering mechanisms of trucks or dollies for motion picture cameras and the like, it is an object of the present invention to provide a novel clutch mechanism associated with the handle bars, or other steering means for the dolly, and so constructed that the operator may shift from one type of steering to another type of steering without removing either hand from the handle bars, the end result being that no jar or interruption occurs when the mode of steering is shifted.

Another object of the invention is to provide a simple and inexpensive steering clutch and transmission mechanism for a camera dolly, and operable to shift from "square" steering to "half O" steering in a very short period of time and when the wheels of the dolly are in predetermined positions.

An additional object is to provide novel differential "half O" steering means such that the axes of two wheels of the camera dolly are caused to intersect at a single point lying on the common axis for the remaining two wheels of the dolly.

These and other objects and advantages of the invention will be more fully set forth in the following specification and claims considered in connection with the attached drawings to which they relate.

Figure 2:
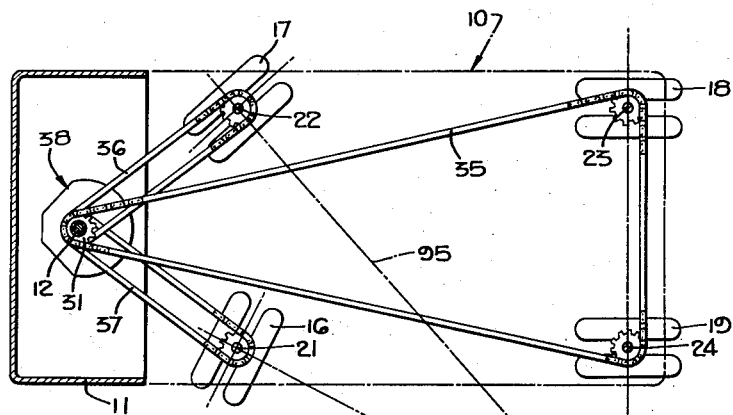
Figure 2 is a horizontal sectional view taken along line 2—2 of Figure 1, and illustrating the dolly wheels in position for "half O" steering.
Figure 3:
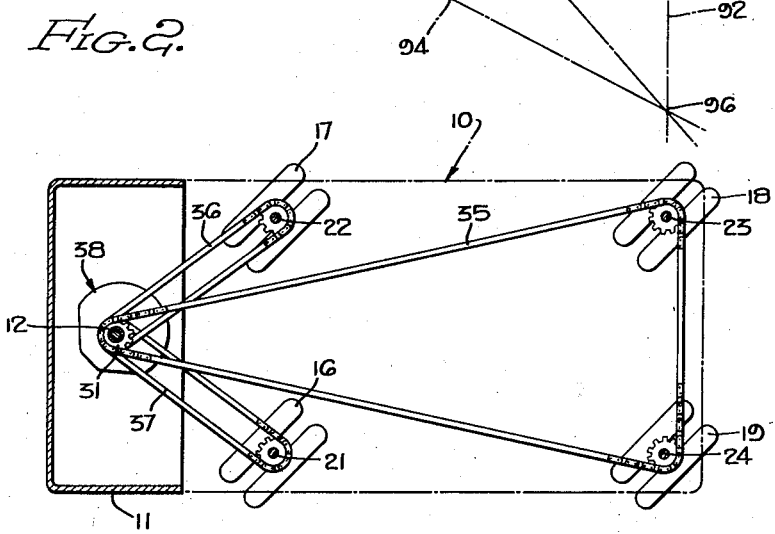

Figure 3 corresponds to Figure 2 but shows the wheels in position for "square" steering;

Figure 4 is an enlarged vertical central sectional view, taken longitudinally of the dolly, and showing the handle bars and associated steering transmission and clutch apparatus as set for the "half O" steering shown in Figure 2;

Figure 5 corresponds to Figure 4 but shows the steering transmission and clutch apparatus as shifted to effect the "square" steering shown in Figure 3;

Figure 6 is a horizontal sectional view taken along line 6—6 of Figure 4, showing the cam and cam follower portions of the transmission mechanism in the positions assumed when all four wheels of the dolly are directed forwardly;

Figure 7 corresponds to Figure 6 but shows the cam follower portions of the clutch mechanism as set to cause the "half O" steering position illustrated in Figure 2;

Figure 8 is a sectional view taken generally along line 8—8 of Figure 4, with portions broken away to show the detent mechanism in the handle bars; and Figure 9 is a transverse sectional view along line 9—9 of Figure 8.

Figure 1:
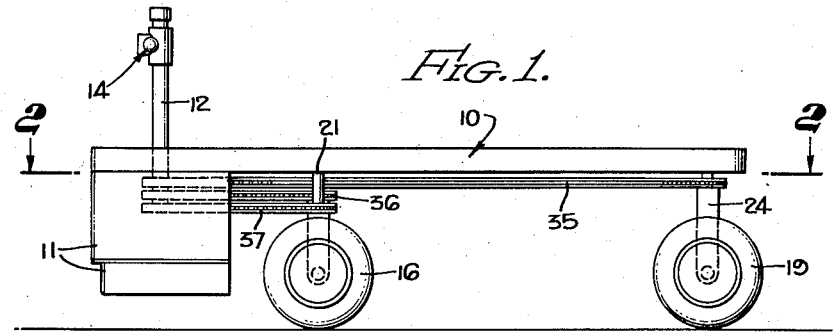
Figure 1 is a schematic side elevational view of a camera dolly incorporating the steering mechanism of the present invention.

Referring to the drawings and particularly to Figures 1-3, there is illustrated a camera dolly comprising a generally rectangular platform or body 10 having a depending transmission housing 11 at the rear portion thereof, the steering transmission mechanism within the housing 11 being associated through a vertically disposed tubular steering shaft 12 with handle bars 13 and 14 (Figure 8). The handle bars 13 and 14 operate through the shaft 12, and the transmission mechanism within housing 11, to steer the four wheels 16—19 of the dolly, the wheels preferably being of the double type in order to increase the stability of the vehicle. The axles for the wheels 16—19 are horizontal and are suitably journaled, respectively, in vertically disposed shafts 21—24 which are in turn journaled in platform 10 for turning about vertical axes. The shafts 21—24 are preferably located at the four corners of a rectangle corresponding generally to the rectangular shape of the platform or body 10.

In the illustrated form of the invention, the operator walks behind the dolly, that is to say to the left in Figures 1-3, and pushes on handle bars 13 and 14 to effect both propulsive and steering functions. Alternatively, however, the operator could ride upon the dolly and one or more of the wheels 16—19 could be provided with suitable motive power, not shown. Although the body 10 has been shown as a simple platform on which a motion picture camera may be mounted by any suitable means, it is preferred that the platform embody an automatic lift mechanism, not shown, by which the camera may be selectively elevated, depressed, and otherwise adjusted.

Referring next to Figures 4 and 5, steering shaft 12 is suitably journaled in platform 10 and in an underlying horizontal plate 26 of transmission housing 11, for example by means of ball bearings and suitable thrust bearing means, the latter preventing vertical movement of shaft 12. Mounted concentrically over the shaft 12 in transmission housing 11 are three independently rotatable sleeves 27, 28 and 29, on which are fixedly mounted, respectively, sprockets 31, 32 and 33. The sprocket 31 is associated through a chain 35 (Figures 2 and 3) with sprockets on the shafts 23 and 24 for the front wheels 18 and 19 of the dolly, so that when the chain 35 is actuated the wheels 18 and 19 are turned in the same direction and through the same angle. Sprocket 32 is connected through a chain 36 with a sprocket on shaft 22 for rear wheel 17, whereas sprocket 33 is connected through a chain 37 with a sprocket on the shaft 21 for rear wheel 16. The rear wheels 16 and 17 are turned upon actuation of chains 36 and 37 as will be described in detail subsequently, in corresponding directions and through either the same or different turning angles.

In order to provide differential turning of rear wheels 16 and 17 when the transmission is set for "half O" steering, a cam 38 having a generally rectangular reinforcing portion 39 is welded horizontally to the lower end of sleeve 27 beneath the other sleeves and the various sprockets. As illustrated in Figures 6 and 7, the cam is formed with a generally U-shaped cam slot 41 which is somewhat flattened in curvature. More particularly, the base 42 of cam slot 41 is substantially further from the axis of steering shaft 12 than are the respective end portions 43 and 44 of the cam slot. Slot 41 is, however, symmetrical about a bisecting axis, the end portions 43 and 44 being the same distance from the steering shaft axis.

Welded to steering shaft 12 directly beneath cam 38 is an actuator crank 46 the outer end of which is longitudinally slotted at 47 to receive a vertical cam follower bolt 48. As shown in Figures 4–7, the bolt 48 serves to interconnect a cam follower disc 49 which rides in cam slot 41, a connecting link 50 which is pivotally connected to the outer end of a crank 51 welded on sleeve 28, and a connecting link 52 pivotally connected to the outer end of a crank 53 welded on sleeve 29. Links 50 and 52, and cranks 51 and 53, are constructed and mounted in a toggle arrangement.

With the described arrangement, and assuming that cam 38 is locked in the position shown in Figures 2, 6 and 7 as will be described subsequently, the turning of handle bars 13 and 14 operates through shaft 12 to rotate actuator crank 46 and thus shift cam follower bolt 48 and disc 49 in cam slot 41, for example from the position shown in Figure 6 to that shown in Figure 7. The outer ends of connecting links 50 and 52 move with bolt 48 and operate to turn their associated cranks 51 and 53, respectively, and thus sleeves 28 and 29. These sleeves are associated through sockets 32 and 33 and chains 36 and 37, respectively, with the vertical shafts 22 and 21 for rear wheels 17 and 16. It follows that when cam 38 is stationary and shaft 12 is turned by the handle bars, rear wheels 16 and 17 are turned in the same direction but, due to the toggle action to be described hereinafter, through differing angles depending upon the curvature of cam slot 41. When cam 38 is held in locked position the sprocket 31, for chain 35 and front wheels 18 and 19, is also held locked since these elements are rigidly associated through sleeve 27. Accordingly, the front wheels 18 and 19 remain fixed in direction when the cam is stationary and rear wheels 16 and 17 are turned through cam action, this mode of steering being termed "half O" steering as previously indicated.

Proceeding next to a description of the clutch means associated with the steering transmission for selectively locking cam 38 to produce the "half O" steering described above, or releasing cam 38 and driving it together with steering shaft 12 to produce "square" steering as will be described hereinafter, these means comprise a clutch shaft 54 mounted concentrically within steering shaft 12 and associated with a rotatable handle bar shaft 55, the latter forming part of both handle bars 13 and 14 as shown in Figure 8. More specifically, handle bar shaft 55 is journaled in a pair of bearing sleeves 57 which are welded transversely of a collar 58 fixed on steering shaft 12 as shown in Figures 4 and 5. Mounted in a housing cap 59 on collar 58, and in apertures in the collar and the steering shaft, is a pinion 61 which is pinned over shaft 55 for rotation therewith. Pinion 61 is meshed with a rack portion 62 (Figures 4 and 5) of clutch shaft 54, so that turning of shaft 55 operates through the rack and pinion to raise or lower shaft 54 in accordance with the direction of rotation.

In order to prevent undesired turning of shaft 55, detent means are provided as shown in Figures 8 and 9. The detent means comprise a plunger 63, mounted in a bore 64 formed in one end of shaft 55, and biased inwardly by a helical compression spring 66 seated between it and a plug at the outer end of the bore. Secured to plunger 63 and extending radially outwardly through a slot in shaft 55 is a trigger 67, the inner end of the trigger being shown as inserted into a notch 68 formed in one end of a bearing sleeve 57. In order to release the detent means and permit rotation of shaft 55 for downward movement of clutch shaft 54, the operator merely shifts the trigger 67 outwardly to releasing position, and then turns shaft 55 in a clockwise direction as viewed in Figures 4, 5 and 9, pinion 61 then rotating clockwise to cause rack 62 and shaft 54 to shift downwardly as desired. When shaft 54 reaches its lower position, trigger 67 snaps into a second notch 69, illustrated in Figure 9, to again lock shaft 55 against turning.

It is a very important feature of the invention that the described operation of the detent means and handle bar shaft 55, to effect raising and lowering of clutch shaft 54, may be effected by the operator without removing his hands from the handle bars. For this purpose trigger 67 is designed to be operated by the thumb of the operator while his remaining fingers grasp the handle bar 14. It follows that the operator may shift from one type of steering to the other type without any interruption or jar in the movement of the camera dolly.

Clutch shaft 54 is provided at its lower end with an axial screw 72 extended through a slot 73 in one end of a bell crank lever 74, the latter being pivoted at 75 to a bracket 77 which is welded on the underside of housing plate 26. The other end of bell crank lever 74 extends upwardly through a slot in plate 26 for pivoting between the arms 78 of a generally U-shaped latch element, the base 79 of the latch element being secured to cam 38 and its reinforcing portion 39 as by a screw 81. When clutch shaft 54 is in the elevated position shown in Figure 4, with trigger 67 registered in notch 68 as shown in Figure 8, bell crank 74 is pivoted counterclockwise between latch element arms 78 and serves the function of locking cam 38 against rotation. When, on the other hand, clutch shaft 54 is in the lower position shown in Figure 5, bell crank 74 is rotated clockwise out from between arms 78 and the cam 38 is free to rotate as will next be described.

To effect rotation of cam 38, a cross pin 82 is secured through clutch shaft 54 and extends through longitudinal slots 83 in steering shaft 12 for insertion into diametrically opposed notches 84 in a collar 85. Collar 85 is welded to sprocket 31 and is thus connected to sleeve 27, the latter sleeve being also welded to sprocket 31. When shaft 54 is in the upper position shown in Figure 4, cross pin 82 is disposed above notches 84, so that rotation of steering shaft 12 has no effect in rotating collar 85. When, however, clutch shaft 54 is shifted to the lower position shown in Figure 5, cross pin 82 is inserted into notches 84, and subsequent rotation of steering shaft 12 operates through collar 85, sprocket 31 and sleeve 27 to effect rotation of cam 38, the latter being unlocked when shaft 54 is in the lower position and as previously described.

Index means are provided to insure that clutch shaft 54 may only be raised or lowered, for shifting of cross pin 82 into and out of notches 84 and for shifting of bell crank 74 into and out of the space between arms 78 of the latch element, when these elements are properly registered and when all four wheels 16—19 of the dolly are in predetermined steering positions. The index means comprise a horizontal plate 87 suspended on elements 88 beneath plate 26 and adjacent steering shaft 12. Plate 87 is provided with a notch 89 through which a pin 91, mounted transversely of shaft 54, may pass upon raising and lowering of the shaft, suitable slots being provided in steering shaft 12 to permit vertical movement of pin 91 relative thereto. The location of notch 89 relative to pin 91 is such that these elements register only when all four wheels 16—19 of the dolly are in predetermined positions, preferably directed forwardly. This occurs when the steering transmission mechanism is in the position shown in Figure 6.

In the operation of the wheel steering mechanism for the camera dolly, let it be assumed that the mechanism is initially set for "half O" steering as shown in Figures 4, 8 and 9, and that the various elements are in the position shown in Figure 6. At this time clutch shaft 54 is in its upper position effecting counterclockwise pivot of bell crank 74 about pivot point 75 and between latching arms 78 to lock cam 38 against rotation. Furthermore, the cross pin 82 is disposed above notches 84 of collar 85, so that steering shaft 12 and its contained shaft 54 are free to turn with the handle bars 13 and 14 despite the fact that collar 85, sprocket 31 and sleeve 27 are locked together with the cam. As previously indicated, the locked sprocket 31 is associated through chain 35 with the front wheels 18 and 19 of the dolly to cause these wheels to remain fixed in direction, the direction being a forward one as shown in Figure 2 so that the common axis 92 of both front wheels projects laterally from the dolly. Furthermore, and when the steering transmission elements are positioned as shown in Figure 6, the parts are so oriented that the rear wheels 16 and 17 are forwardly directed, their common axis then being parallel to axis 92.

In order to turn rear wheels 16 and 17, for example to the position shown in Figure 2, the operator walking behind the vehicle and propelling the same by means of handle bars 13 and 14 turns the handle bars counterclockwise as viewed from above. This effects counterclockwise rotation of steering shaft 12, crank 46, cam follower bolt 48, and the connected ends of links 50 and 52, for example to the position shown in Figure 7. Due to the fact that the ends 43 and 44 of the U-shaped cam slot 41 are closer to the axis of steering shaft 12 than is the base 42 of the cam slot, the described movement of bolt 48 and links 50 and 52 provides a differential steering action by which the rear wheel 16 turns through a greater angle than wheel 17. The shape of cam slot 41 is such that the axes 94 and 95 of rear wheels 16 and 17 intersect at a common point 96 which lies on the common axis of both front wheels 18 and 19. This condition is met regardless of the oblique positions to which rear wheels 16 and 17 are turned.

To illustrate the above, it is pointed out that when crank 46 and cam follower bolt 48 are shifted from the position shown in Figure 6 to that shown in Figure 7, a toggle effect is produced which causes cranks 51 and 53 to spread apart, or assume greater angles relative to crank 46. This spreading or toggle action results from the fact that ends 43 and 44 of cam slot 41 are closer to the axis of rotation than is the center 42 of the cam slot. Because of the toggle action, crank 53 will turn through a greater angle than crank 46, and crank 51 through a lesser angle than crank 46, when cam follower bolt 48 is shifted counterclockwise from the Figure 6 position to the Figure 7 position. Since, as shown in Figures 4 and 5, crank 53 is connected through sleeve 29, sprocket 33, and chain 37 to the sprocket on the steering shaft 21 for rear wheel 16, that wheel turns through a relatively large angle. On the other hand, since crank 51 is connected through sleeve 28, sprocket 32 and chain 36 to the sprocket on the shaft 22 for rear wheel 17, that wheel turns through a relatively small angle. As previously stated, the shape of cam slot 41 is such that the described toggle effect causes the horizontal axes 94 and 95 of wheels 16 and 17 to intersect at a point 96 of a common axis 92 for front wheels 18 and 19. Since slot 41 is symmetrical, the exact reverse action occurs when turning is in the opposite direction. The desired "half O" steering is thus achieved in a very simple manner and regardless of the direction in which the apparatus is turned.

To change from the "half O" steering shown in Figures 2 and 4 to the "square" steering showing in Figures 3 and 5, the operator hooks his thumb around trigger 67 (Figure 8) and shifts it out of notch 68, after which he rotates shaft 55 clockwise, as viewed in Figures 4, 5 and 9, to effect downward movement of shaft 54. This downward movement can only occur, however, when pin 91 of the index means is registered with notch 89, and such registry only takes place when the handle bars and steering shaft 12 are turned so that the transmission elements are in the position shown in Figure 6, all four wheels 16—19 of the dolly then being directed forwardly as previously stated. When the wheels are all directed forwardly and pin 91 is registered with notch 89, cross pin 82 is also registered with notches 84 of collar 85, so that continued clockwise rotation of handle bar shaft 55 causes pin 91 to pass downwardly through notch 89, and pin 82 to be inserted into notches 84. In addition, the downward shifting of shaft 54 causes bell crank 74 to pivot clockwise out from between arms 78 and unlock cam 38 so that the latter is free to rotate. As soon as shaft 54 reaches its lower position, the detent trigger 67 snaps into notch 69.

Turning of handle bars 13 and 14, and thus steering shaft 12, when the elements are in the Figure 5 position will effect the desired "square" type steering shown in Figure 3. It will be understood that the turning of shaft 12 in a given direction will operate through crank 46, cam follower bolt 48, links 50 and 52, etc., to effect turning of the rear wheels 16 and 17 in the same direction. However, and as distinguished from the "half O" type steering, no toggle or differential effect is obtained since the cam 38 is turned in the same direction and through the same angle as the cam follower bolt 48 and crank 46, there being no relative movement providing any camming action. This movement of cam 38 is illustrated in Figure 3, in which the cam is shown as pivoted counterclockwise through a predetermined angle, it being understood that crank 46, cam follower bolt 48, etc., pivot counterclockwise through the same angle and thus remain at the base 42 of cam slot 41. The described rotation of cam 38 is caused by the cross pin 82 which is registered in notches 84 and rotates the collar 85, sprocket 31, shaft 27 and the cam 38 through an angle determined by the angle of rotation of shaft 12. Since the sprocket 31 is connected through chain 35 to both front wheels 18 and 19, it follows that all four wheels 16—19 turn through the same angle and that their axes remain parallel as desired.

In order to shift back from "square" to "half O" steering, the operator releases detent 67 and attempts to rotate shaft 55 counterclockwise as shown in Figures 4, 5 and 9, but this movement is prevented by the plate 87 and pin 91 until the latter is in registry with notch 89 in the plate, such registry only occurring when all four wheels 16—19 are directed forwardly as previously stated. As soon as pin 91 registers with notch 89 the handle bar shaft 55 may be rotated counterclockwise to effect upward movement of shaft 54 to the Figure 4 position, after which the detent trigger 67 is released and permitted to snap into notch 68. The upward movement of shaft 54 causes pin 91 to shift upwardly through notch 89, causes cross pin 82 to shift out of notches 84, and causes bell crank 74 to pivot counterclockwise between the arms 78 of the latch element with which it is registered at this time. The device is then set for "half O" steering as previously described.

When the apparatus is set for "square" steering, the operator walking therebehind and pushing on handle bars 13 and 14 may cause it to move in any forward, rearward, transverse or oblique direction, in accordance with the requirements of the particular scene being shot. When the apparatus is set for "half O" steering, the operator may cause the dolly to rotate about any given point or subject, for example a person standing at the point of intersection 96 (Figure 2) of the various wheel axes 92, 94 and 95. A transition between "half O" and "square" steering, or vice versa, may be effected very smoothly and without the necessity of withdrawing either hand from the handle bars 13 and 14, it being merely necessary to hook the trigger 67 with the thumb and shift it out of its notch 68 and 69, and then rotate shaft 55 either counterclockwise or clockwise. The exact change takes place as soon as pin 91 of the index mechanism is registered with associated notch 89, and occurs without a jar or interruption so that the camera may be kept in operation at all times.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a steering transmission mechanism for a camera dolly or the like, first drive means connected to steer at least one wheel of said dolly, second drive means connected to steer at least one other wheel of said dolly, a steering shaft adapted to be turned by the operator of said dolly, a rotatable cam, cam follower means associated with said cam and connecting said steering shaft and said first drive means, said cam follower means operating when said cam is held against rotation to effect movement of said first drive means in accordance with the angle of turning of said steering shaft and the contour of said cam, and clutch means operable when in a first position to lock said cam against rotation and when in a second position to drivingly connect said steering shaft with said second drive means and with said cam, said cam follower means and said clutch means being constructed to prevent relative movement between said cam follower means and said cam during turning of said steering shaft when said clutch means is in said second position.

2. The invention as claimed in claim 1, in which index means are provided to prevent shifting of said clutch means between said first and second positions except when said shaft is turned to a position at which all of the wheels of said dolly are in a predetermined aligned condition.

3. The invention as claimed in claim 1, in which said clutch means includes an operating element located on a handle bar at the end of said steering shaft.

4. In a steering transmission mechanism for a camera dolly or the like, first drive means connected to steer at least one wheel of said dolly, second drive means connected to steer at least one other wheel of said dolly, cam means, an operator controlled steering shaft rotatable relative to said cam means, a first cam follower linkage associated with said cam means and connecting said steering shaft and said first drive means, a second cam follower linkage associated with said cam means and connecting said steering shaft and said second drive means, and means for holding said cam in a fixed position, said first and second cam follower linkages serving, respectively, to effect movement of said first and second drive means in accordance with the angle of turning of said steering shaft and the shape of said cam means when said cam is held in said fixed position.

5. The invention as claimed in claim 4, in which said cam means and said cam follower linkages are so constructed that the horizontal axes of said one dolly wheel and said other dolly wheel intersect each other along a predetermined straight line.

6. The invention as claimed in claim 4, in which said cam follower linkages include: crank means on said steering shaft, a cam follower connected to said crank means and associated with said cam means, and links connected at one end to said cam follower, and at the other end, respectively, to crank portions of said first and second drive means.

7. The invention as claimed in claim 6, in which said cam follower linkages are so related to each other that said links and said crank portions of said first and second drive means combine to form a toggle mechanism.

8. In a steering transmission mechanism for a camera dolly or the like, first drive means connected to steer at least one wheel of said dolly, second drive means connected to steer at least one other wheel of said dolly, third drive means connected to steer at least one additional wheel of said dolly, an operator controlled steering shaft, a rotatable cam, clutch means selectively movable from a first position at which said cam remains stationary to a second position drivingly connecting said steering shaft with said third drive means and with said cam, first cam follower means associated with said cam and connecting said steering shaft and said first drive means, and second cam follower means associated with said cam and connecting said steering shaft and said second drive means, said first and second cam follower means serving, respectively, to effect movement of said first and second drive means in accordance with the angle of turning of said steering shaft and the shape and contour of said cam when said cam remains stationary, said cam follower means and said clutch means being constructed to prevent relative movement between said cam follower means and said cam during turning of said steering shaft when said clutch means is in said second position.

9. The invention as claimed in claim 8, in which means are provided to lock said cam against rotation when said clutch means is in said first position.

10. A dolly for motion picture cameras, comprising an elongated platform, four supporting wheels mounted two at each end of said platform for rotation about horizontal axes and for turning about vertical axes, a generally vertically disposed steering shaft journaled at one end of said platform and having handle bars at its upper end, a cam mounted horizontally around said steering shaft and rotatable independently thereof, said cam being provided with a symmetrical U-shaped cam slot the ends of which are closer to the axis of said steering shaft than is the base thereof, a cam follower mounted in said cam slot and connected to a crank on said steering shaft, three independently rotatable sleeves mounted concentrically around said steering shaft, the first of said sleeves being connected to said cam and to both wheels at one end of said platform to turn said wheels about said vertical axes, the second and third of said sleeves being independently connected to the wheels at the other end of said platform to turn said wheels about said vertical axes, a toggle linkage connecting said cam follower and said second and third sleeves, and clutch means operable when in a first position to lock said cam against rotation, and when in a second position to drive said first sleeve and said cam with said steering shaft.

11. The invention as claimed in claim 10, in which said cam slot and said toggle linkage are so shaped that the horizontal axes of the wheels at said other end of said platform intersect at a point on a common horizontal axis of said wheels at said one end of said platform.

12. The invention as claimed in claim 10, in which said clutch means include a clutch shaft mounted within said steering shaft and having a rack thereon, and a handle bar shaft journaled in said handle bars and associated through a pinion with said rack.

13. The invention as claimed in claim 12, in which detent means are provided on said handle bar shaft to selectively lock the same in a plurality of predetermined positions, and index means are provided to prevent movement of said clutch shaft except when all of said wheels are directed forwardly.

14. Transmission mechanism comprising: a support, a shaft journaled in said support, a rotatable driven member, a rotatable cam, cam follower means associated with said cam and connecting said shaft and driven member, and clutch means for selectively locking said cam against rotation relative to said support to effect differential movement of the driven member and shaft in accordance with the angle of turning of said shaft and contour of said cam, and against rotation relative to said shaft whereby to fix said shaft, cam, cam follower means and driven member together for simultaneous, equal turning thereof.

15. Transmission mechanism comprising: a support, a shaft journaled in said support, a pair of rotatable driven members, a rotatable cam, first cam follower means associated with the cam and connecting the shaft and one of said driven members, second cam follower means associated with said cam and connecting the shaft and the other of said driven members, and clutch means for selectively locking said cam against rotation relative to said support to effect simultaneous differential movement of the driven members in accordance with the angle of turning of the shaft and contour of the cam, and against rotation relative to said shaft whereby to fix said shaft, cam, cam follower means, and driven members together for simultaneous, equal turning thereof.

16. The subject matter of claim 15 and a third driven member rigidly connected to said cam for rotation therewith.

References Cited in the file of this patent

UNITED STATES PATENTS

| | | |
|---|---|---|
| 1,255,775 | Mueller | Feb. 5, 1918 |
| 1,681,893 | Barshell | Aug. 21, 1928 |
| 2,203,810 | Berry | June 11, 1940 |
| 2,228,247 | Cunningham | Jan. 14, 1941 |
| 2,470,496 | Krilanovich | May 17, 1949 |
| 2,715,534 | Hoge et al. | Aug. 16, 1955 |

FOREIGN PATENTS

| | | |
|---|---|---|
| 451,813 | Great Britain | Aug. 12, 1936 |